May 16, 1933.    L. E. WIRTH    1,909,646
STRIPPER BAR STRUCTURE
Filed Feb. 27, 1932
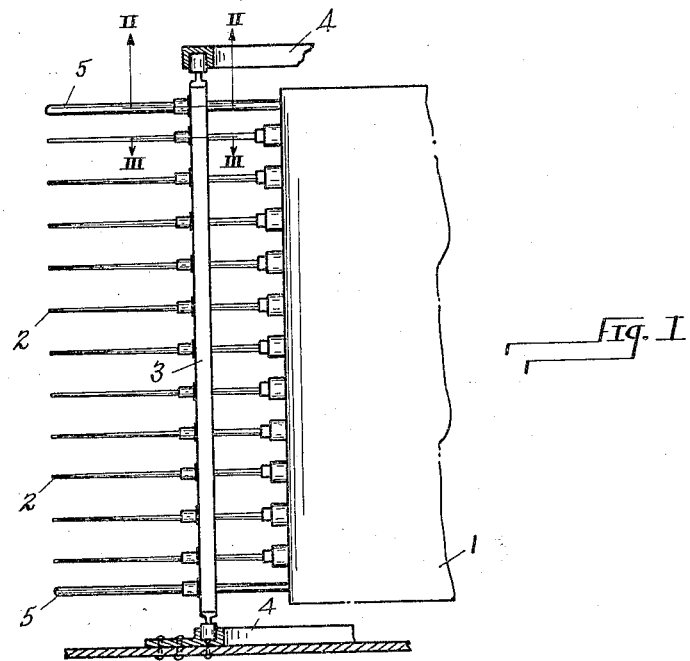
Fig. I
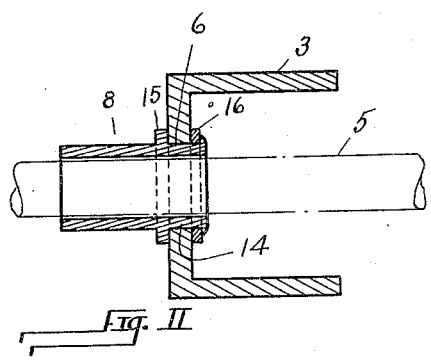
Fig. II
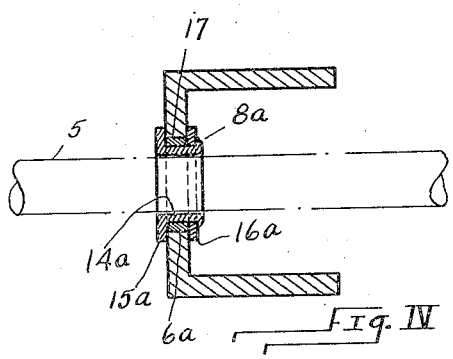
Fig. IV
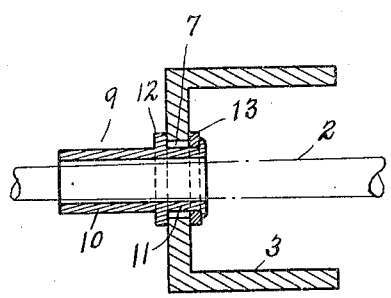
Fig. III
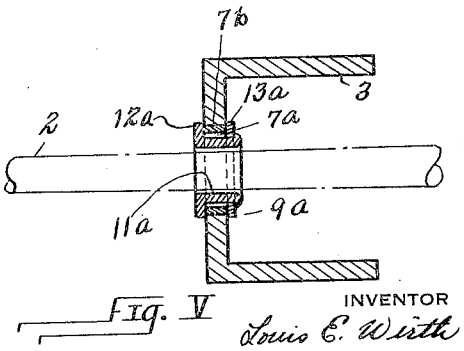
Fig. V
INVENTOR
Louis E. Wirth
by Christy Christy and Wharton
his attorneys Patented May 16, 1933

1,909,646

UNITED STATES PATENT OFFICE

LOUIS E. WIRTH, OF PITTSBURGH, PENNSYLVANIA, ASSIGNOR TO ALBERT M. HANAUER, OF PITTSBURGH, PENNSYLVANIA

STRIPPER BAR STRUCTURE

Application filed February 27, 1932. Serial No. 595,535.

This invention relates to stripper bar structure for cotton harvesting machines.

Various prior patents, notably patent to Hiram N. Berry No. 1,747,566, dated February 18, 1930, disclose cotton harvesting machines in which cotton picking needles are carried by a revolving cylinder and are rotated about their axes by suitable driving connections. In order to remove from these picking needles cotton which has been collected thereon during revolution of the cylinder and rotation of the needles, a stripper bar is associated with each vertical row of needles carried by the cylinder. These stripper bars are perforated to permit the picking needles, and stripper bar guides, to project through them. At an appropriate point during each single revolution of the cylinder the stripper bar associated with each vertical row of needles moves outwardly along the needles to strip therefrom the cotton which has been previously gathered by the needles of that vertical row.

Breakage of the picking needles is caused by jamming a picking needle against rotation in its orifice in the stripper bar. This may result either from the entrance of cotton into the orifice and between the orifice wall and the picking needle, or by any distortion of the picking needle which causes it to bear against the wall of its orifice during outward movement of the stripper bar.

Breakage of the picking needles is lessened to some extent by mounting sleeves or nipples in the orifices of the stripper bar, to surround the picking needles and to provide an increased bearing surface between the stripper bar and each needle. If, however, such sleeves or nipples are rigidly mounted in the stripper bar, needle breakage may still occur for the reasons given above. I therefore so mount in the stripper bar the sleeves or nipples which surround the needles that play is provided between the sleeves and the walls of the orifices in which they lie, and that the sleeves are also rotatable with respect to the stripper bar.

In the accompanying drawing Figure I is a fragmentary illustrative elevation, showing in general the interrelation between the needle-carrying cylinder of a cotton harvesting machine, the picking needles, and a stripper bar arranged to act on the needles; Figure II is a detail sectional view taken on the line II—II of Figure I, and showing on an enlarged scale a fixed sleeve suitable for receiving a stripper bar guide finger; Figure III is a sectional detailed view taken on the line III—III of Figure I, showing on an enlarged scale a loosely and rotatably mounted sleeve for one of the picking needles of the assembly; Figure IV is a similar view showing a modified form of fixed sleeve for a stripper bar guide finger; and Figure V is a similar view showing a modified form of loose and rotatable sleeve for a picking needle.

In the drawing, reference numeral 1 designates the cylinder of a cotton harvesting machine which carries cotton picking needles 2. A stripper bar 3 is shown in Figure I as associated with a vertical row of cotton picking needles on the cylinder 1, and has related therewith a cam track 4 arranged to cause movement of the stripper bar longitudinally of the needles during revolution of the cylinder. In order to relieve picking needles 2 of the weight of the stripper bar, and the tortional effect caused by the action of the cam track 4 on the stripper bar, stripper bar guide fingers 5 are caused to project through stripper bar 3.

Stripper bar guide fingers 5 each projects through an orifice 6 in the stripper bar, and each of the picking needles projects through an orifice 7 in the stripper bar. In each of the orifices 6 is a sleeve 8, which surrounds immediately one of the stripper bar guide fingers 5. In each of the orifices 7 is a sleeve 9 which immediately surrounds one of the picking needles 2.

With reference to Figure III of the drawing it will be seen that the sleeve 9 comprises a forward extension 10, a hub portion 11, and collars 12 and 13 which bear respectively against the inner and outer faces of the stripper bar wall. Hub portion 11 of the sleeve is circular in cross-section and is so proportioned with respect to orifice 7 that it lies loosely therein, being retained in the orifice by means of the collars 12 and 13, which are so spaced with respect to the thickness of the stripper bar wall that they do not bind the sleeve immovably in position.

Since sleeve 9 is rotatable in orifice 7 the sleeve may rotate with the picking needle, should the picking needle become jammed in the sleeve for any reason. The play of the sleeve in its orifice also gives a certain degree of tolerance for such distortion of the picking needle as would tend to present resistance to the outward movement of the stripper bar relatively thereto.

While so proportioning and arranging the sleeve associated with each of the picking needles, I prefer for reasons of simplicity to utilize substantially similar sleeves for the stripper bar guide fingers, so proportioning and mounting these sleeves 8, however, that they are firmly fixed in the stripper bar. For this purpose the hub 14 of a sleeve for a stripper bar guide finger has a close fit in its orifice 6 in the stripper bar, and the collars 15 and 16 firmly engage the opposite faces of the stripper bar wall. The reason for the immovable mounting of sleeves 8 associated with the stripper bar guide fingers 5, is that such rigid mounting, particularly as associated with the loose mounting of the sleeves 9, surrounding each of the picking needles, wholly relieves the picking needles of the weight of the stripper bar. This immovable mounting also relieves the needles of angular pressure of the stripper bar produced by the cam track 4 during inward and outward movement of the stripper bar.

I have found it generally advantageous when employing loosely mounted and rotatable sleeves for the picking needles, to dispense with the forward extension shown in Figures II and III. With particular reference to Figure V of the drawing, this figure shows a picking needle and loose sleeve mounted in a stripper bar of aluminum or similar metal, and illustrating the modified abbreviated form of picking needle sleeve 9a. In this view the stripper bar 3 has in the orifice 7a thereof a bushing 7b of steel or similar metal. Collars 12a and 13a are identical with collars 12 and 13 of Figure III. Hub 11a is circular in cross-section, and is of such diameter as to lie loosely in orifice 7a, similarly to the form and mounting of the hub 11 as shown in Figure III. The forward extension 10 of the sleeve 9 as in Figure III is, however, omitted.

In Fig. IV of the drawing there is shown a sleeve 8a having a hub 14a which closely fits a fixed bushing 17 in such manner that the hub 14a of sleeve 8a fits tightly in orifice 6a, similarly to the showing of Figure II. Similarly collars 15a and 16a firmly engage the opposite faces of the stripper bar wall lying adjacent the orifice 6a therethrough. The forward extension as shown in this modified form of sleeve for a stripper bar guide finger is, however, omitted as with the sleeve 9a for a picking needle shown in Figure V.

As above stated the use of loosely mounted and rotatable sleeves for the picking needles greatly reduces breakage of picking needles due to jamming. The use of loosely mounted and rotatable sleeves for the picking needles associated with rigidly mounted sleeves for the stripper bar guide fingers wholly prevents the bending or breakage of needles due to the weight of the stripper bar, or to the normal action of the stripper bar caused by the cam track associated with it.

I claim as my invention:

1. In a stripper bar structure for use in cotton harvesting machines, a stripper bar having therein orifices for the projection of picking needles through the bar and orifices for the projection of stripper bar guide fingers through the bar, sleeves rotatably mounted in the orifices for the picking needles, and sleeves immovably mounted in the orifices for the stripper bar guide fingers.

2. In a stripper bar structure for use in cotton harvesting machines, a stripper bar having therein orifices for the projection of picking needles through the bar and orifices for the projection of stripper bar guide fingers through the bar, sleeves loosely and rotatably mounted in the orifices for the picking needles, and sleeves immovably mounted in the orifices for the stripper bar guide fingers.

In testimony whereof I have hereunto set my hand.

LOUIS E. WIRTH.